Aug. 23, 1932.  J. H. DORAN  1,873,743
ELASTIC FLUID TURBINE
Filed Nov. 15, 1930
Fig. 1.
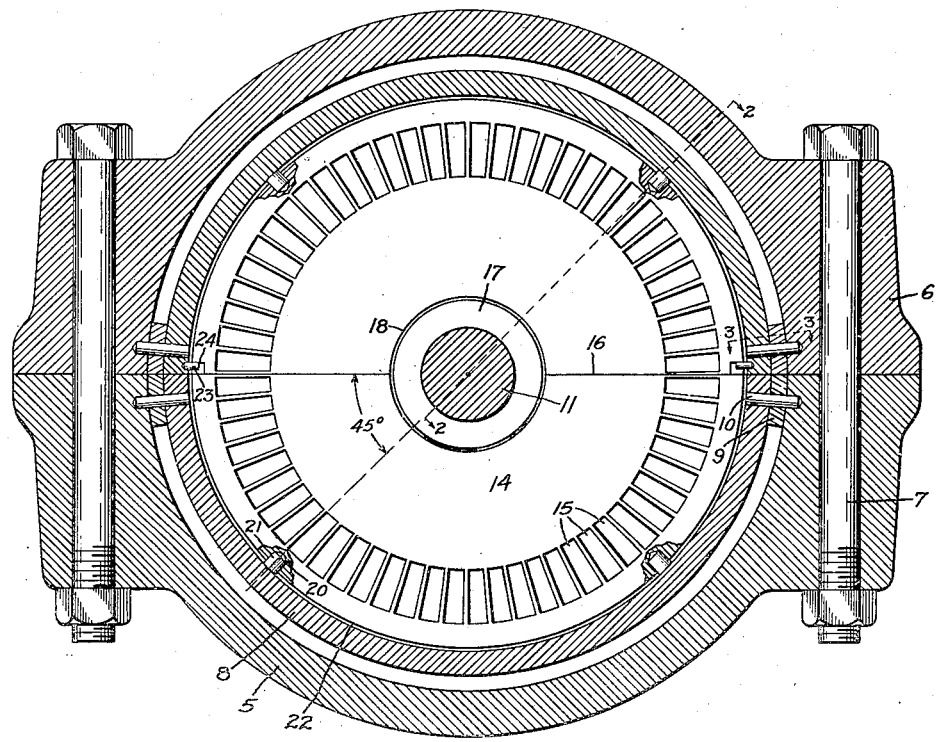
Fig. 2.
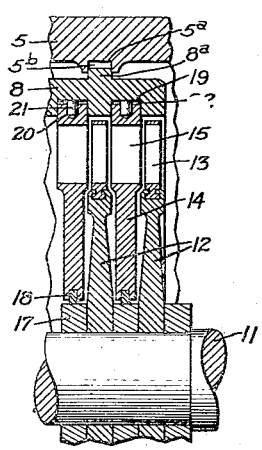
Fig. 3.
Fig. 4.
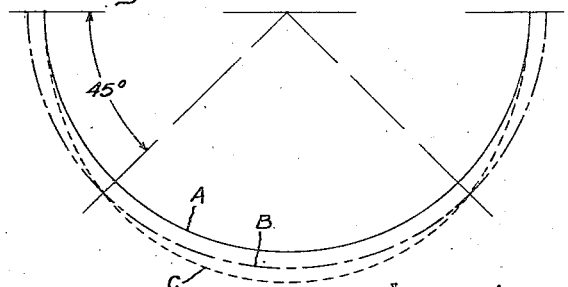
Inventor:
John H. Doran,
by Charles E. Tullar
His Attorney.

Patented Aug. 23, 1932

1,873,743

UNITED STATES PATENT OFFICE

JOHN H. DORAN, OF SCOTIA, NEW YORK, ASSIGNOR TO GENERAL ELECTRIC COMPANY, A CORPORATION OF NEW YORK

ELASTIC FLUID TURBINE

Application filed November 15, 1930. Serial No. 495,955.

The present invention relates to elastic fluid turbines and especially to those operating at high pressures of the order of 1200 pounds for example, with correspondingly high temperatures. The casings for such turbines have to be of massive construction to withstand the high pressure, and furthermore must be provided with massive flanges on opposite sides thereof above and below the plane of separation, and through which extend the bolts for clamping the halves of the casing together. The outer surface of the casing which may be and usually is lagged is exposed to room temperature while the inner surface of the casing and also the interior working parts are exposed to high temperature operating fluid of which steam is an example. Due to the fact that the inner and outer parts are exposed to different temperatures, to the fact that the inner or interior parts heat up more quickly than the outer part or casing, and to the fact that the massive bolting flanges on the casing tend to cause unequal expansion in different parts thereof, the problem is presented of providing means which will hold the working parts in concentric relation while permitting of unequal expansion, particularly in starting when the inner parts attain a high temperature very much more quickly than the outer parts.

The object of my invention is the provision in an elastic fluid turbine of improved means which permit the working parts to expand and contract at will while maintaining their proper concentric relation and clearances.

For a consideration of what I believe to be novel and my invention, reference is had to the accompanying description and the claims appended thereto.

In the drawing, Fig. 1 is a vertical, cross-section showing the manner in which the diaphragms and their supporting casing are mounted; Fig. 2 is a section along the line 2—2 of Fig. 1, looking in the direction of the arrows; Fig. 3 is a section along the line 3—3 of Fig. 1, looking in the direction of the arrows; and Fig. 4 is a diagrammatic sketch illustrating the action of the parts under temperature changes.

Referring to the drawing, 5 indicates the turbine casing which is shown as split in the horizontal plane of its axis to form upper and lower halves, the respective halves being formed with massive flanges 6 extending lengthwise of the casing to receive bolts 7 for fastening them together. As before indicated these flanges on account of their large mass tend to cause unequal expansion of different parts of the casing, and especially in starting the turbine into operation as they heat more slowly than the other parts. Within the turbine casing 5, and spaced therefrom is a second or inner casing 8, which is likewise split in the horizontal plane of its axis to form upper and lower halves. Both the inner and outer walls of this casing are exposed to steam having the same or approximately the same temperatures, and because of that fact heat up more quickly than the outer casing which is exposed to steam on one side only. In the space between the casings are supporting or spacer blocks 9 for the inner casing. These blocks are inserted between the casings along the horizontal axis thereof and are secured to the casings by pins 10. These pins also prevent rotation of the inner casing in case of rubbing of the bucket wheels. The horizontal edges of the inner casing are thus rigidly secured to the outer casing and are prevented from moving relatively thereto. In other words, the inner casing is supported at two diametrically opposite points, all other parts being free to move in response to temperature changes.

As above pointed out the massive flanges of the outer casing do not heat up as quickly as the other and thinner parts, and since the supporting means or blocks are in line therewith it follows that the inner casing cannot expand equally and radially in all directions. However, by a suitable selection of the metal for the inner casing and of its cross-section with suitable clearances at all points beyond the supporting means, the expansion can still take place but the enlargement due to said action takes place largely in a direction perpendicular to its horizontal support. As a result of this the wall of the inner casing when initially heated, instead of being truly cylindrical as when cold, has a greater diameter in a vertical plane passing through the axis of the shaft. To state the matter in another way, since the expansion of the inner casing due to increase of temperature is inherent in any such structure, means are provided whereby said expansion is confined to certain regions or parts which will not affect the desired concentric relation of the relatively movable parts within the outer casing.

The turbine shaft 11 has mounted thereon wheels 12 carrying radial buckets 13. Intermediate the bucket carrying wheels are the usual diaphragms 14 carrying nozzles 15 through which the elastic fluid is discharged against the buckets. The diaphragms being within the inner casing are subjected to hot steam on both sides and hence heat up more quickly than the outer casing and at much the same rate as the inner casing. To ensure uniform expansion as nearly as possible the sections of the metal of said parts are made as nearly equal as possible. It is necessary to maintain the axes of these diaphragms coincident with that of the shaft to prevent rubbing. The diaphragms are formed as upper and lower halves corresponding to the halves of the casings, being split as indicated at 16. On the shaft 11 are packing members 17 which cooperate with packing members 18 carried by the diaphragms.

The inner casing 8 is formed with spaced annular grooves 19, Fig. 2, in which are supported the diaphragms. In the periphery of each of the diaphragms is formed a plurality of sockets 20 in which are rigidly secured radially disposed pins 21. These pins are supported in the diaphragms at points which are at approximately 45° to the axis of the driving shaft, the reasons for which will be explained more fully later on. The tips of the pins project slightly above the peripheral surfaces of the diaphragms and abut the inner wall of the inner casing, thereby leaving a clearance 22 between each diaphragm and the inner casing. It is therefore apparent that the pins form means by which the weight of the diaphragms is supported by the inner casing, the pressure thereon due to steam pressure being taken by the side walls of the grooves. To prevent steam from flowing between the two casings and thus shunting the diaphragms and buckets, the inner casing is provided with a ring $8^a$ which is located in an annular groove $5^a$ formed in the outer casing. Between the periphery of the ring and the bottom of the groove is a clearance $5^b$ whose radial depth is greater than the movement of any part of the casing due to expansion.

Along the horizontal joint the edges of the inner casing 8 are provided with horizontally projecting pins 23 adapted to engage shoulders 24 formed in the peripheries of the upper halves of the diaphragms. These pins function to prevent relative rotation between the diaphragms and the casing 8 and permit of the upper parts of the diaphragms being lifted with the upper halves of the casings.

The foregoing arrangement of parts serves to allow the casing 8 and the diaphragms supported thereby to expand and contract freely while at the same time maintaining the diaphragms properly centered relative to the driving shaft, as will be seen more particularly by reference to Fig. 4, in which the movement of the parts has been greatly exaggerated for the purpose of illustration. In this connection it must be borne in mnid that the diaphragms will expand and contract radially and that this cannot be prevented. The line A represents the lower half of the diaphragm supporting casing 8. While only the lower half of the casing is shown it will be undestood that the following explanation applies equally to the upper half. In the position shown by line A the casing is in its normal position before the admission of any elastic fluid. If the casing were free to expand in all directions upon the admission of such fluid it would assume the position indicated by the broken-and-dotted line B. Since it cannot thus expand due to the presence of the supporting blocks which are aligned with the massive flanges of the outer casing, and since it will expand when heated, a deformation of the inner casing follows with the result that the casing becomes slightly eliptical with its major axis in a vertical plane. This is permitted by the clearance between the two casings below the supporting blocks. At the same time the inner casing is being deformed the diaphragm is expanding radially in all directions. This is permitted by reason of the clearance between its periphery and the bottom wall of the annular groove in the inner casing, and particularly because of the radial clearance in line with the supporting blocks and massive flanges of the outer casing. The amount that the inner casing is deformed varies of course with the temperature of the steam. In some instances of which I have knowledge the vertical dimension or major axis is of the order of one-eighth of an inch greater than the horizontal dimension or minor axis. This enlargement in a vertical plane and the general shape assumed by the casing is indicated by the dotted line C. As suming that the total unrestrained expansion would cause a wall of the inner casing to move outward radially at all points from full line A to dotted line B, then the point of intersection of line B with the dotted line C, representing the same wall when deformed by reason of its supports, will give the proper location for the diaphragm supporting pins 21 and actual experiences as well as theory show that these two lines cross at angles of 45° with respect to the horizontal plane of division of the casing. This means that when the pins are so placed they will follow the outward deforming movement of the inner casing as the parts expand and thus maintain contact with the wall and hold the diaphragm in its central position with respect to the shaft. As the outer casing gradually expands and the bolting flanges become heated in the course of operation of the turbine, the supporting blocks of the inner casing will gradually move outward thereby relieving the side pressure in the inner casing and the latter then assumes a cylindrical or more nearly cylindrical shape, the supporting pins 21 on the diaphragms maintaining their contact with the adjacent wall of the casing at all times.

To state the matter another way, the only portions of the casing which in its outward and inward movements due to expansion and contraction which follow truly radial planes are those located at 45° with respect to a horizontal plane passing through the axis of the shaft and diaphragms, and for that reason the pins 21 are so located as to register with said planes.

Another and important advantage of my improved construction is that it in no way interferes with the assembly. With the parts of the two casings open and the shaft and its wheels in place the half diaphragms can be mounted in place by a turning movement thereof, the pins 21 merely sliding in the grooves in the casing.

What I claim as new and desire to secure by Letters Patent of the United States, is:

1. In a turbine, the combination of a rotor, spaced outer and inner tubular casings, means for holding the inner casing fixed with respect to the outer casing at two diametrically opposite points to confine its maximum expansion to a plane perpendicular to said points, a member carried by the inner casing which is free to expand radially in all directions, and through which motive fluid flows to the rotor, and angularly spaced means for supporting the weight of the member and maintaining it concentric with the axis of the rotor, which are located between the periphery of the member and a wall of the inner casing and in register with those portions of said wall which with respect to their radial expansion are not affected by the provision of said first named means.

2. In a turbine, the combination of a rotor, spaced outer and inner tubular casings, the axes of which are to be maintained coincident under temperature changes, the inner casing responding more quickly to temperature changes than the outer casing, means carried by the outer casing for supporting and restraining from substantially relative movement the inner casing at two points so that as it expands it is compelled to assume an elliptical form with its major axis perpendicular to the plane of the supports, a cylindrical member located inside of the inner casing, which expands uniformly and radially, and devices located between the periphery of the member and the adjacent wall of the inner casing, said devices contacting with the casing and being angularly and equally spaced, each of said devices occupying a position that it will follow and maintain positive engagement with the inner casing under all conditions.

3. In a turbine, the combination of a rotor, outer and inner tubular casings the axes of which are to be maintained coincident with each other and with that of the rotor, means carried by the outer casing for supporting the inner casing at two diametrically opposite points, all other parts of the inner casing being free to move in response to temperature changes, a nozzle diaphragm carried by the inner casing for supplying motive fluid to the rotor, and means spaced approximately 45° above and below a plane passing through said diametrically opposite points and located between the periphery of the diaphragm and the adjacent wall of the inner casing, said means maintaining engagement with the inner casing as the latter is deformed by its supports due to changes of temperature.

4. In a turbine, the combination of outer and inner tubular casings which are concentric when cold and are spaced apart to form a passage for elastic fluid to heat the inner casing, both of said casings being divided into halves in a horizontal plane, means carried by the outer casing for supporting the inner casing at two diametrically opposite points preventing substantially relative movement between the casings at these points and permitting the other parts thereof to move without restraint under changes of temperature, a plurality of nozzle diaphragms carried by the inner casing, a rotor having rows of buckets acted upon by the fluid issuing from the nozzles of the diaphragms, and means for separately supporting each of the diaphragms located between the periphery thereof and the adjacent wall of the inner casing, each of said means being spaced approximately 45° above and below a horizontal plane passing through the axes of the casings.

5. In an elastic fluid turbine, the combination of a rotor comprising a shaft having bucket wheels affixed thereto, nozzle carrying diaphragms associated with said wheels, a casing in which said diaphragms are mounted, means for securing said casing along its horizontal axis to prevent relative radial expansion in a plane through said axis, and means for supporting said diaphragms in said casing comprising pins secured to said diaphragms and projecting therefrom, said pins resting against said casing and being positioned in said diaphragms in planes which are at an angle of approximately 45° to a horizontal plane through the shaft.

6. In an elastic fluid turbine, a shaft, bucket carrying wheels affixed to said shaft, nozzle diaphragms associated with said wheels, a casing for the diaphragms, supporting means interposed between said diaphragms and said casing, said supporting means being disposed in planes which are at an angle of about 45° to a horizontal plane through said shaft, and means for securing said casing in the horizontal plane of its axis to prevent radial expansion thereof in said plane.

7. In combination, a shaft, bucket carrying wheels affixed thereto, nozzle carrying diaphragms between said wheels, a casing supporting said diaphragms, supporting members interposed between said diaphragms and said casing in planes at 45° to a horizontal plane through the shaft, an outer casing concentric with said first named casing but spaced therefrom, and means interposed between said casings along the horizontal plane thereof for securing said casings together whereby movement of said first mentioned casing relative to said second mentioned casing is prevented, said means comprising spacer blocks secured to both of said casings.

8. In an elastic fluid turbine, an outer casing comprising two halves having massive bolting flanges, an inner casing, means for securing the inner casing in spaced relation to the outer casing located near the dividing plane of the two outer half casings, diaphragms located in the inner casing, and spacing means between the diaphragms and the inner casing positioned at angles of the order of 45° with respect to said dividing plane whereby said last named spacing means maintain a constant engagement between said diaphragms and the inner casing.

9. In an elastic fluid turbine, a rotor comprising a shaft and bucket wheels fastened to the shaft, diaphragms interposed between the bucket wheels, an inner casing having annular grooves to support the diaphragms, spacing means provided at angles of the order of 45° with respect to a horizontal plane through the shaft between the inner casing and the diaphragms to permit of relative movement between them, an outer casing comprising two halves bolted together in a horizontal plane surrounding the inner casing, and spacing means between the casings comprising cylindrical segments located near the horizontal plane through the shaft and pins extending through holes in said cylindrical segments and the outer and inner casing walls whereby said inner casing is substantially prevented from relative expansion in said horizontal plane but free to expand in a plane vertically through the shaft.

In witness whereof, I have hereunto set my hand this 14th day of November, 1930.

JOHN H. DORAN.